(12) United States Patent
Cocquet et al.

(10) Patent No.: US 9,290,657 B2
(45) Date of Patent: Mar. 22, 2016

(54) FLUIDIZING AGENT AND METHOD USING SAID AGENT

(71) Applicants: RHODIA OPERATIONS, Paris (FR); CENTRE NATIONAL DE LA RECHERCHE SCIENTIFIQUE, Paris (FR)

(72) Inventors: Clio Cocquet, Mondonville (FR); Simona Ceccia, Lyons (FR); Didier Long, Sainte Foy les Lyon (FR); Lise Trouillet-Fonti, Villette-de-Vienne (FR)

(73) Assignees: Rhodia Operations, Paris (FR); Centre National De La Recherche Scientifique, Paris (FR)

( * ) Notice: Subject to any disclaimer, the term of this patent is extended or adjusted under 35 U.S.C. 154(b) by 0 days.

(21) Appl. No.: 14/387,941

(22) PCT Filed: Mar. 22, 2013

(86) PCT No.: PCT/EP2013/056140
§ 371 (c)(1),
(2) Date: Sep. 25, 2014

(87) PCT Pub. No.: WO2013/144034
PCT Pub. Date: Oct. 3, 2013

(65) Prior Publication Data
US 2015/0051335 A1    Feb. 19, 2015

(30) Foreign Application Priority Data

Mar. 26, 2012 (FR) .................................... 12 52681

(51) Int. Cl.
| | |
|---|---|
| *C08L 77/06* | (2006.01) |
| *B29B 9/06* | (2006.01) |
| *B29B 9/14* | (2006.01) |
| *B29B 9/16* | (2006.01) |
| *C08G 69/48* | (2006.01) |
| *C08L 77/02* | (2006.01) |
| *C08L 75/06* | (2006.01) |
| *B29C 45/00* | (2006.01) |
| *C08G 18/42* | (2006.01) |

(52) U.S. Cl.
CPC . *C08L 77/06* (2013.01); *B29B 9/06* (2013.01); *B29B 9/065* (2013.01); *B29B 9/14* (2013.01); *B29B 9/16* (2013.01); *B29C 45/0001* (2013.01); *C08G 18/42* (2013.01); *C08G 69/48* (2013.01); *C08L 75/06* (2013.01); *C08L 77/02* (2013.01)

(58) Field of Classification Search
CPC ......... C08L 77/06; C08L 75/06; C08L 77/02; B29B 9/06; B29B 9/065; B29B 9/14
USPC ........................................ 524/401
See application file for complete search history.

(56) References Cited

U.S. PATENT DOCUMENTS

| | | |
|---|---|---|
| 4,369,285 A | 1/1983 | Sanderson et al. |
| 4,656,228 A | 4/1987 | Richter et al. |
| 5,906,998 A | 5/1999 | Hoshino et al. |
| 5,973,013 A | 10/1999 | Igwe |
| 2012/0065282 A1* | 3/2012 | Trouillet-Fonti et al. ....... 521/59 |

FOREIGN PATENT DOCUMENTS

| | | |
|---|---|---|
| DE | 41 36 078 A1 | 10/1991 |
| EP | 0 023 667 A1 | 7/1980 |
| EP | 0 141 950 A2 | 9/1984 |
| WO | 90/11329 A1 | 10/1990 |
| WO | 95/13307 A1 | 5/1995 |
| WO | 96/20244 A1 | 7/1996 |
| WO | 99/10433 A1 | 3/1999 |

* cited by examiner

Primary Examiner — John Uselding

(57) ABSTRACT

The present disclosure relates to a compound U comprising at least one urethane functional group, and its use as a fluidizing agent or fluidizing agent precursor in a process for preparing a polyamide article. The process comprises heating a composition comprising at least one polyamide PA and at least one compound U comprising at least one urethane functional group, at a temperature T, for a time t and at a pressure P, wherein the temperature T and the time t are such that $CO_2$ is generated and the melt viscosity of the composition is decreased, in comparison with the melt viscosity of the composition without compound U, and recovering the article. The fluidizing agent can further enable the production of an article that has an unreduced density and/or in which the mean molar mass of the polymers of the composition is increased.

19 Claims, No Drawings

FLUIDIZING AGENT AND METHOD USING SAID AGENT

This application is a U.S. national phase entry under 35 U.S.C. §371 of International Application No. PCT/EP2013/056140, filed on Mar. 22, 2013, which claims priority to French Application No. 1252681, filed on Mar. 26, 2012, the entirety of all of which are being incorporated herein by reference for all purposes.

The invention relates to the use of a specific compound as melt fluidizing agent or fluidizing agent precursor for a composition comprising a thermoplastic polymer, in particular polyamide. It also relates to a process for the preparation of a polyamide-based article in which the melt viscosity of the composition comprising polyamide is reduced and in which the conditions, in particular of temperature, of time and of pressure, are such that they make possible the generation of $CO_2$, the latter being dissolved in said composition. The fluidizing agent or the fluidizing agent precursor can also make it possible to obtain an article exhibiting a density which is not reduced and/or an increase in the average molar mass of the polymers of the composition.

In some processes for the shaping of articles made of thermoplastic polymer, such as extrusion and injection, in particular injection molding, it is desirable to have a melt viscosity which is reduced. This is because the decrease in the melt viscosity can make it possible to facilitate certain processes for the preparation of articles comprising a thermoplastic polymer and/or can make it possible to obtain articles having more complex shapes.

As a general rule and in particular in the transformation processes envisaged above, it is desired for the polyamide-based compositions to exhibit a good compromise in the following three properties: melt flow, good mechanical properties and surface appearance.

It is in particular desirable for the compositions to be sufficiently fluid when they are molten to be conveyed and handled easily and rapidly in certain shaping devices, such as, for example, injection molding. The fact of having a fluid composition can make it possible to inject parts having specific (complex, thin, long, and the like) geometries. In extrusion, the fluidity of the formulations can make it possible not to be limited by the torque of the extruder, of advantage in particular in order to be able to increase the content of fillers and/or to limit the self-heating and thus to better control the temperature during the processing. This can make it possible to avoid the decomposition of the polymer matrix or heat-sensitive additives.

Mention may be made, among these particularly advantageous mechanical properties, of the impact strength, the flexural or tensile modulus, or the flexural or tensile breaking stress. The prior art frequently cites the use of reinforcing fillers, in particular glass fibers, to improve the mechanical properties.

Finally, in particular in the case of parts molded from thermoplastic compositions, a clean and uniform surface appearance is also desired. This constraint becomes a particularly difficult problem to solve when a thermoplastic composition comprising a high load of reinforcing fillers, such as glass fibers, is used. This is because these fillers have a tendency to detrimentally effect in a major way the surface appearance of the molded parts. In order to overcome this constraint, recourse may be had to thermoplastic compositions exhibiting a high fluidity.

The prior art frequently describes an increase in fluidity by a decrease in the average molar mass of the thermoplastic matrix. However, this route for increasing fluidity brings about a decline in the mechanical properties of the articles obtained, for example a decrease of approximately 20% in the Charpy impact strength at RH0 and RH50 for a decrease in the viscosity of 50% in the case of virgin PA66.

The result of the above is that it is particularly problematic to obtain a polyamide-based thermoplastic composition exhibiting a good level of these different properties.

Furthermore, while a certain number of documents of the prior art relate to the use of polyurethane and polyamide, they generally avoid being put under conditions such that $CO_2$ is generated, in particular via polyurethane, use starting compounds carrying isocyanate functional groups, envisage filler-free compositions and/or do not envisage the question of melt fluidity.

For example, WO9910433 specifically describes that conditions involving the decomposition of polyurethane, in particular at a temperature of greater than 260° C., are undesirable as they result in a nonhomogeneous extrudate which comprises bubbles (bubbly). The document U.S. Pat. No. 4,656,228 for its part envisages filler-free compositions based on specific polyurethane-polycarbonates. These can result, in particular under the temperature and duration of heating conditions of the present invention, in undesirable effects. The document U.S. Pat. No. 4,369,285 relates to reinforced thermoplastic moldings comprising polyamides and polyurethane but it does not envisage conditions such that the polyurethane generates $CO_2$; in addition, it is silent with regard to the fluidity aspect. DE4136078 relates to coupling reactions between polyamides and polyurethanes, the ends of which in particular exhibit isocyanate functional groups. In none of the cases does it envisage conditions under which urethane functional groups generate $CO_2$. WO95/13307 and WO90/11329 relate to processes involving relatively low processing temperatures. Thus, they do not envisage conditions under which the urethane functional groups generate $CO_2$.

The invention has the objective of solving the abovementioned problems in all or part. It is targeted very particularly at providing a fluidizing agent or a precursor of the latter and a process using this fluidizing agent exhibiting at least one of the following advantages: not to reduce the average molecular weights of the polyamide or thermoplastic polymer present in the article obtained, not or only slightly to affect the average molecular weight of the polyamide, to result in compositions exhibiting improved characteristics and in particular a satisfactory melt viscosity/mechanical characteristics/surface appearance compromise, especially where the process was easy to carry out, not requiring highly specialized and/or expensive equipment.

According to a first aspect, a subject matter of the invention is a process for the preparation of a polyamide article comprising the stages consisting in:

a) heating a composition comprising at least one polyamide PA and at least one compound U comprising at least one urethane functional group, at a temperature T, for a time t and at a pressure P:

the temperature T and the time t being such that they make it possible to generate $CO_2$ and a decrease in the melt viscosity of the composition, in comparison with the melt viscosity of the composition without compound U, the pressure P being such that it makes it possible for the $CO_2$ generated to be dissolved in the blend of PA and compound U, the temperature T being greater than the melting point–30° C., i.e. M.p.–30° C., b) recovering the article.

The term "M.p." is understood to mean, within the meaning of the present invention, the melting point of the polyamide PA.

The $CO_2$ generated in this process originates essentially, in particular at least 85%, especially at least 90%, indeed even at least 95%, or in part from reactions involving, directly or indirectly, the compound U; in particular, it originates entirely from reactions involving the compound U. In other words, the $CO_2$ originates essentially or in part from the urethane functional groups.

The compound U is in particular involved in the following reactions (in which $R_3NH_2$ and $R_4COOH$ respectively represent the end amine and carboxylic acid groups of the polyamide):

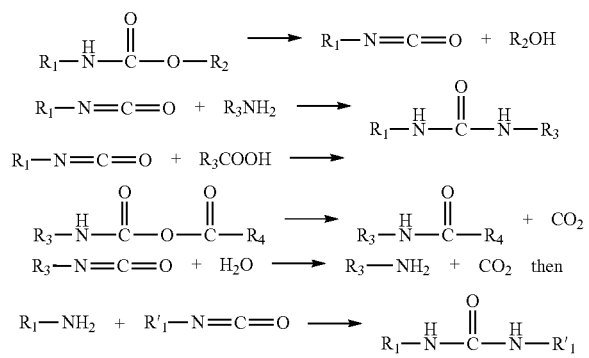

The process according to the invention can thus make it possible not to reduce the molar mass of the polymers, a conventional method for reducing the viscosity. The process according to the invention can even make possible an increase in the average molar mass of the polymers of the composition.

The process according to the invention can make it possible for the fluidized composition to comprise no or few remainders of fluidizing agents, it being possible for the $CO_2$ to be removed and it being possible for the remainders of compounds U to be bonded to PAs.

Furthermore, in comparison with some methods which make it possible to lower the viscosity, the $CO_2$ exhibits the advantage of not being toxic, of being nonflammable and of being environmentally friendly.

Very particularly, the process makes possible a decrease in the melt viscosity of at least 10%, in particular of at least 20%, especially of at least 25%, in comparison with a composition in which the compound U is replaced by PA and/or in which the PU does not generate $CO_2$ in an effective amount, indeed even does not generate $CO_2$ at all.

In some cases, the process can make possible a decrease of 30%, in particular of 50%, indeed even of 55%, in the melt viscosity.

The melt viscosity of the composition is measured at 896 $s^{-1}$ with a capillary die exhibiting a length/diameter ratio of 30/1. More particularly, this viscosity is measured according to the protocol described in the examples.

The temperature T is greater than the melting point of the PA−30° C., i.e. M.p.−30° C. In particular, this temperature T is greater than or equal to M.p.−10° C. and very particularly T is greater than or equal to the M.p. of the PA.

The temperature can be greater than or equal to 280° C., in particular greater than or equal to 290° C., indeed even greater than or equal to 300° C., indeed even also greater than or equal to 305° C.

The temperature T to be achieved during stage a) of the process of the invention, in particular combined with the time t, must also make possible the formation of carbon dioxide, in particular of an effective amount of $CO_2$.

The term "effective amount" is understood to mean an amount of $CO_2$ generated which makes possible a decrease in the melt viscosity of at least 10%, in particular of at least 20%, in particular of at least 25%, in comparison with a composition in which the compound U is replaced by PA and/or in which the PU does not generate $CO_2$.

In particular, the amount of $CO_2$ given off by the compound U can be greater than or equal to 0.1% by weight, in particular greater than or equal to 0.2% by weight, indeed even greater than or equal to 0.3% by weight, with respect to the total weight of the composition.

The confirmation of release of $CO_2$ by the compound U in the process and the amount generated can be estimated by placing the composition under the conditions of the process, or under conditions similar in terms of temperature, time and shear conditions, and by then bringing the molten composition to atmospheric pressure in order to measure the amount of $CO_2$ given off.

The time for stage a) can vary. However, it is adjusted as a function of various parameters, such as the temperature T and the properties desired. This time can, however, range from 20 seconds to 30 minutes, in particular from 30 seconds to 15 minutes, indeed even from 1 to 6 minutes.

The temperature and the time are such that they make possible a decrease in the melt viscosity of the composition. In particular, they are also such that they make possible an increase in the average molar mass of the polymers of the composition.

This time can also be a function of the use during this stage of a catalyst or a mixture of catalysts. A catalyst can be used to accelerate the decarboxylation reaction of the carbamic and acid anhydride obtained by reaction of the acid functional group with the isocyanate functional group; mention may be made, by way of example, of tertiary amines, such as diazabicyclooctane (DABCO), diazabicycloundecene (DBU) or triethylamine. The preparation of the composition of the invention and the shaping stage, such as the injection molding or the extrusion, starting from this composition can be carried out simultaneously. They can be carried out in identical devices, such as an extrusion device.

The pressure P of the process is in particular such that it makes it possible to retain the $CO_2$ given off dissolved in the blend of PA and compound U; this pressure can in particular be greater than or equal to 10 bar, especially greater than or equal to 20 bar, very particularly greater than or equal to 30 bar, indeed even greater than or equal to 40 bar.

The polyamide PA of the invention is a polyamide of the type of those obtained by polycondensation starting from dicarboxylic acids and diamines or of the type of those obtained by polycondensation of lactams and/or amino acids. The polyamide of the invention can be a blend of polyamides of different types and/or of the same type, and/or copolymers obtained from different monomers corresponding to the same type and/or to different types of polyamide.

The polyamide PA of the invention advantageously exhibits a number-average molecular weight of greater than or equal to 10 000 g/mol, preferably of greater than or equal to 14 000 g/mol and more preferably still of greater than or equal to 16 000 g/mol.

Mention may be made, as examples of polyamides which may be suitable for the invention, of polyamide 6, polyamide 7, polyamide 6,6, polyamide 11, polyamide 12, polyamide 13, polyamide 4,6, polyamide 6,10, polyamide 6,12, polyamide 10,10, polyamide 10,6, polyamide 12,12, polyamide 6,36, semiaromatic polyamides, in particular in which the diamine part is aromatic in all or part and especially is of the meta-xylylenediamine type, for example MXD6, polyphthalamides obtained from terephthalic acid, isophthalic acid and/or naphthalic acid, such as 9T, 10T, 11T, 12T, 13T, 6T/MT, 6T/6I, 6T/66, 66/6T, 6I, 6I/6T, 10N, 11N or 12N, such as the polyamides sold under the Amodel trade name, copolyamide 6/6/6, 6/11, 6/12 and 11/12, their copolymers and alloys.

Mention may in particular be made of polyamide 6, polyamide 6,6, polyamide 11, polyamide 12, polyamide 4,6, polyamide 6,10, polyamide 10,10, polyamide 12,12, polyamide 6,36, semiaromatic polyamides, in particular MXD6, polyphthalamides obtained from terephthalic acid and/or isophthalic acid, such as the polyamide sold under the Amodel trade name, copolyamide 6,6/6,T, their copolymers and alloys.

According to a preferred embodiment of the invention, the polyamide is chosen from polyamide 6, polyamide 6,6, their blends and copolymers. Advantageously, the polyamide is polyamide 6,6.

According to a specific alternative form of the invention, the polyamide PA of the invention is a linear polyamide.

According to another specific alternative form of the invention, the polyamide PA of the invention comprises star-branched or H-branched macromolecular chains and, if appropriate, linear macromolecular chains. The polymers comprising such star-branched or H-branched macromolecular chains are, for example, described in the documents FR 2 743 077, FR 2 779 730, U.S. Pat. No. 5,959,069, EP 0 632 703, EP 0 682 057 and EP 0 832 149.

According to another specific alternative form of the invention, the polyamide PA of the invention is a copolyamide exhibiting a random tree structure. These copolyamides having a random tree structure and their process of preparation are described in particular in the document WO99/03909. According to a specific embodiment of the invention, the polyamide PA of the invention can be a polyamide of low viscosity, such as described in the document WO2008/107314.

The polyamide PA of the invention can also be a composition comprising a linear polyamide and, as additive, a star-branched, H-branched and/or tree polyamide as described above.

The polyamide PA of the invention can also be a composition comprising, as additive, a hyperbranched copolyamide of the type of those described in the document WO 00/68298.

The polyamide PA can optionally comprise other functional groups, such as ester, urea and/or ether functional groups, and the like.

The polyamide PA can be present in the composition in a content ranging from 30% to 99.9% by weight, in particular from 35% to 99% by weight, indeed even from 40% to 98% by weight, with respect to the total weight of the composition.

The compound U comprises at least one urethane functional group. It can be a polyurethane, also known as PU, or a compound of the polyisocyanate blocked by an alcohol or a phenol type. According to a specific embodiment, the compound U is a thermoplastic polyurethane. In particular, the compound U, and more particularly still when it is a polyurethane, is immiscible with PA66.

Whether a compound U, in particular polyurethane, is immiscible with PA66 can be determined in the following way:
granules of PA66 and of compound U, in a 95/5 ratio by weight, are prepared under the conditions of example 1, five sections of granules obtained are observed by electron microscopy, and
the compound U is said to be "immiscible" if, in a surface area of 500 µm² at the center of said granule, at least 10 nodules for which the greatest dimension is at least 50 nm are counted, the count being, of course, the mean of the counts over the five sections.

In the case where the compound U is a polyurethane, it can be obtained from a diisocyanate, a polyol and optionally a short-chain diol. Very particularly, in the case where the compound U is a polyurethane, the latter does not comprise free isocyanate functional groups, in particular at the chain end, and/or it is not a polyurethane comprising at least a polycarbonate part; more particularly still, the end functional groups of said polyurethane are hydroxyl functional groups.

Examples of diisocyanates which can be used for the preparation of the polyurethane are isophorone diisocyanate, 1,3- and 1,4-cyclohexane diisocyanate, 1,2-ethylene diisocyanate, 1,4-tetramethylene diisocyanate, 1,6-hexamethylene diisocyanate, 2,2,4- and 2,4,4-trimethyl-1,6-hexamethylene diisocyanate, 1,12-dodecane diisocyanate, α,α'-diisocyanatodipropyl ether, 1,3-cyclobutane diisocyanate, 2,2- and 2,6-diisocyanato-1-methylcyclohexane, 2,5- and 3,5-bis(isocyanatomethyl)-8-methyl-1,4-methanodecahydronaphthalene, 1,5-, 2,5-, 1,6- and 2,6-bis(isocyanatomethyl)-4,7-methanohexahydroindane, 1,5-, 2,5- and 2,6-bis(isocyanato)-4,7-methanohexahydroindane, 2,4'- and 4,4'-dicyclohexyl diisocyanate, 2,4- and 2,6-hexahydrotolylene diisocyanate, perhydro-2,4'- and -4,4'-diphenylmethane diisocyanate, α,α'-diisocyanato-1,4-diethylbenzene, 1,3- and 1,4-phenylene diisocyanate, 4,4'-diisocyanatobiphenyl, 4,4'-diisocyanato-3,3'-dichlorobiphenyl, 4,4'-diisocyanato-3,3'-dimethoxybiphenyl, 4,4'-diisocyanato-3,3'-dimethylbiphenyl, 4,4'-diisocyanato-3,3'-diphenyl-biphenyl, 2,4'- and 4,4'-diisocyanatodiphenylmethane, naphthalene 1,5-diisocyanate, 2,4- and 2,6-toluene diisocyanate, N,N'-(4,4'-dimethyl-3,3'-diisocyanato-diphenyl)uretdione, m-xylylene diisocyanate, dicyclohexylmethane diisocyanate, tetramethylxylylene diisocyanate, and the analogs and mixtures.

The polyol used for the preparation of the polyurethane can be a polyester, a polycaprolactone or a polyether. The polyesters result from the condensation of a dicarboxylic acid, generally adipic acid, with a diol. Mention may be made, as example of polyester, of poly(butanediol adipate), poly(hexanediol adipate), poly(ethanediol/butanediol adipate), and the like. The polycaprolactones are polyesters resulting from the polymerization of ε-caprolactone and diols.

Mention may be made, as example of polyether, of poly(ethylene glycol) (PEG), poly(propylene glycol) (PPG), poly(tetramethylene glycol) (PTMG), and the like.

The short-chain diol which can be used for the preparation of the polyurethane can be hexanediol or butanediol, or an aromatic diol. The polyurethane is advantageously a thermoplastic polyurethane.

The polyurethane can be aromatic or aliphatic, for example as a function of the aromatic or aliphatic nature of the diisocyanate used to prepare it. Advantageously, the polyurethane of the invention is aliphatic.

The polyurethane of the invention can be a blend of several different polyurethanes.

According to a specific embodiment of the invention, the polyurethane exhibits a number-average molecular weight of greater than or equal to 2000 g/mol.

Advantageously, it exhibits a number-average molecular weight of greater than or equal to 5000 g/mol, preferably of greater than or equal to 10 000 g/mol and more preferably still of greater than or equal to 13 000 g/mol.

The compound U can be present in the composition in a content ranging from 0.1% to 15% by weight, in particular from 0.5% to 12% by weight, especially from 1% to 10% by weight and very particularly from 2% to 5% by weight, indeed even from 2% to 4% by weight, with respect to the total weight of PA and of compound U.

Advantageously, the PA/compound U ratio by weight ranges from 1000 to 2, in particular from 100 to 4, very particularly from 100 to 9, indeed even from 50 to 15.

Advantageously, the composition comprises a number of moles of urethane functional group which is greater than or equal to the number of end amine functional groups of the PA. In particular, the composition comprises a number of moles of urethane functional group which is greater than or equal to the sum of the number of moles of end amine functional groups of the PA and of the number of moles of end carboxylic acid functional groups of the PA.

In addition, the composition can comprise a number of moles of urethane functional group which is less than or equal to the sum of the number of moles of end amine functional groups of the PA, of the number of moles of end carboxylic acid functional groups of the PA and of twice the number of moles of water.

The composition can also comprise a high proportion of additives and be, for example, used as masterbatch intended to be blended with another thermoplastic composition, in particular based on polyamide.

Furthermore, the composition can comprise pore-forming agents, surfactants, nucleating agents, such as talc, and/or plasticizers.

The composition can also comprise compounds such as mattifying agents, for example titanium dioxide or zinc sulfide, pigments, dyes, heat or light stabilizers, bioactive agents, soil release agents, antistatic agents, flame retardants, and the like.

Advantageously, the composition comprises at least one reinforcing filler and/or one bulking filler. This filler can be chosen from fibrous fillers, such as glass fibers, carbon fibers or natural fibers, and/or non-fibrous fillers. The natural fibers can be hemp and/or flax. Mention may be made, among the non-fibrous fillers, of particulate fillers, lamellar fillers and/or exfoliable or non-exfoliable nano fillers, such as alumina, carbon black, clays, zirconium phosphate, kaolin, calcium carbonate, copper, diatomaceous earths, graphite, mica, silica, titanium dioxide, zeolites, talc or wollastonite, polymeric fillers, such as dimethacrylate particles, glass beads or glass powder.

The composition can comprise several types of reinforcing fillers. The glass fibers can be of the "chopped" type, in particular having a diameter of between 7 and 14 µm. These fillers can exhibit a mean length of between 0.1 and 5 mm. These fillers can exhibit a surface sizing which ensures the mechanical adhesion between the fibers and the polyamide matrix, in particular under critical environmental conditions, such as, for example, in contact with the fluids of engines.

In particular, the composition comprises from 20% to 70% by weight, especially from 30% to 60% by weight, of reinforcing filler, with respect to the total weight of the composition.

The composition can be prepared by intimate blending of the various compounds, in particular in the form of powders, or by introduction of the urethane compound into the polyamide in the molten state. The blending can, for example, be carried out in an extrusion device.

The polyamide can also be provided in the form of granules, which are coated with urethane compound.

When the composition is prepared using an extrusion device, the composition can subsequently be put into the form of granules. These granules can then be used as is to carry out the process according to the invention. The granulation of the composition can be carried out by any type of granulation technology, in particular conventional granulation by delivery of the extruded rod(s) from the die and cooling in a water bath or granulation by underwater pelletizing.

According to a specific embodiment of the invention, the composition is prepared by introduction of the urethane compound into the molten polyamide, the temperature of the medium being chosen so as to avoid any significant release of gas.

Advantageously, the temperature for preparation of the composition of the invention is greater than or equal to M.p.−30° C., preferably greater than or equal to M.p.−20° C., more preferably still greater than or equal to M.p.−10° C., M.p. being the melting point (in ° C.) of the polyamide PA of the composition.

The temperature for preparation of the composition is in particular less than or equal to 275° C., indeed even 270° C. and more particularly 265° C., in particular in the case where the compound U is an aliphatic polyurethane.

The composition can be prepared in an extrusion device and then be put in the form of granules. The granules obtained can subsequently be introduced directly into a transformation and shaping device.

Advantageously, the composition is in the form of granules. The granulation of the composition can be carried out by underwater pelletizing. This is not what was used here but it might be advantageous at least for the stage of preparation of PA/compound U granules.

According to a first specific embodiment, the temperature T and the time t are also such that they also make it possible for the average molar mass of the thermoplastic polymer to be at least equal to the molar mass of the starting polyamide. The average molecular weight can be weight-average or number-average.

The number-average molar mass can be increased by at least 5%, in particular by at least 7%, indeed even by at least 10%.

The weight-average molar mass can be increased by at least 5%, in particular by at least 7%, very particularly by at least 10%, indeed even by at least 15%.

Stage a) can be carried out at a temperature greater than or equal to the M.p. of the PA and sufficient for there to be release of gas, in particular of $CO_2$. Furthermore, stage a) can be carried out at a temperature less than or equal to the higher of the temperatures chosen between M.p.+40° C. and 310° C.

The residence time t of the composition at a temperature T can range from 20 seconds to 15 minutes, in particular from 30 seconds to 10 minutes, indeed even from 1 to 5 minutes.

The time t (s) and the temperature T (° C.) can correspond to the following relationship:

$$(T-275) \times t < 18\,000$$

in particular in the cases of PA6, 66, MXD6 and their copolymers, and very particularly in the cases of PA6, 66 and copolymers.

According to a second specific embodiment, the process results in an article exhibiting a density d greater than 0.95 times that of its components (weighted by their content in the composition resulting in the article), it being possible for the density d of the article, consisting of the compounds C1 to Cx in contents X1 to Xn, as % by weight with respect to the total weight of the composition, to be defined by the following relationships (1) and (2):

$$d \geq A \times D \quad \text{relationship (1)}$$

with $$1/D = [(X1\%/(100 \times \text{density } C1)) + (X2\%/(100 \times \text{density } C2)) \ldots (Xn\%/(100 \times \text{density } Cn))] \quad \text{relationship (2)}$$

and in which:
- C1, C2, ..., Cn represent the compounds 1, 2, ..., n present in the composition employed in order to obtain the article,
- X1%, X2%, ..., Xn % are the % by weight respectively of the compounds C1, C2, ..., Cn,
- X1%+X2%+ ... +Xn %=100, and
- A=0.95, in particular A=0.98, indeed even A=0.99.

In the present description, A×B means A multiplied by B.

An article corresponding to this relationship can in particular be obtained by a process involving an injection molding in which there is introduced into the mold an amount of composition which makes possible the filling of the mold with an expansion gas, in particular of the $CO_2$ generated.

In particular, the density can be greater than or equal to 1, in particular greater than or equal to 1.10, and, in particular in the case of a composition comprising glass fibers as filler, the density can be greater than or equal to 1.2. In particular, in the case of a composition comprising glass fibers as filler, especially in a content ranging from 30% to 60% by weight with respect to the total weight of the composition, the density of the article can range from 1.3 to 1.8.

Of course, the first and second embodiments can be combined.

Very particularly, the process according to the invention comprises a shaping stage a') employing a molding device, in particular injection molding device, and extrusion device.

In particular, where this process comprises an injection molding stage, the amount of composition injected is such that it makes it possible not to form voids and/or microvoids resulting in a decrease in the density; in particular, the injection molding does not result in a lightened foam.

According to another of its aspects, the subject matter of the invention is an article comprising a polyamide and a polymer derived from the polyamide, in particular in which:
- the number-average and/or weight-average molar mass of the polymers present in this article is greater than that of the starting polyamide, and/or
- exhibiting a density as defined above.

This article is capable of being obtained, indeed even is directly obtained, according to the process as defined in the present description.

According to yet another of its aspects, a subject matter of the invention is the use of a urethane compound as:
- melt fluidizing agent precursor of a composition comprising at least one thermoplastic polymer, in particular polyamide, or
- melt fluidizing agent of a composition comprising a thermoplastic polymer, in particular polyamide, when the urethane compound is under conditions where it generates $CO_2$, in particular an effective amount.

The fluidizing agent or the fluidizing agent precursor can also make it possible, at the same time as an improvement in the melt fluidity:
- not to decrease, indeed even to increase, the average molar mass of the thermoplastic polymer and/or
- to obtain an article having a density as defined in the present description.

The examples below are given by way of illustration of the invention.

EXAMPLES

The contents of end carboxylic acid and amine groups of the polyamides are quantitatively determined by potentiometry.

EAG means end amine groups and ECG means end carboxylic acid groups.

The number-average and weight-average molar masses of the polyamides were determined by gel permeation chromatography as polystyrene equivalent in dichloromethane after derivatization and detection by UV absorbance.

The Viscosity Numbers (VN) of the polyamides are measured starting from a 0.5% solution of polymer dissolved in 90% formic acid, according to the standard ISO EN 307.

The rheological properties of the polyamide granules comprising or not comprising the fluidizing agent were studied by means of an in-line rheometer, At Line Rheometer (ALR) from Göttfert (ALR-M 71.02 model 019.03.05). The ALR is a rheometer composed of a capillary die fed from a single-screw extruder via a gear pump. The single-screw extruder exhibits a diameter of 25 mm and a length/diameter ratio of 20.

The mass flow of molten polymer and thus the shear gradient are controlled by the speed of the gear pump.

The melt viscosity is calculated from the difference between pressures measured at the inlet and at the outlet of the capillary. In the case of the ALR, the pressure at the outlet of the capillary is atmospheric pressure.

In order to be able to carry out viscosity measurements at a higher outlet pressure, a counter-pressure chamber, also sold by Göttfert, was added to the outlet of the capillary die of the ALR. This counter-pressure chamber comprises a conical needle valve which can move vertically by means of a screw pitch. The vertical movements of the conical valve make it possible to adjust the level of constriction of the stream of molten polymer and consequently the counter-pressure in the chamber and also the mean pressure of the viscosity measurement.

Example 1

Manufacture of the Polyamide Granules Comprising the Fluidizing Agent

The compounds used are as follows:
- PA: Polyamide 66 having a VN of 138 ml/g, comprising 1000 ppm of water, exhibiting the following contents of end groups: EAG=56 meq/kg and ECG=74 meq/kg.
- PU: Aliphatic thermoplastic polyurethane based on ε-caprolactone (epsilon-caprolactone), sold under the name Krystalgran PN03-214 by Huntsman.

The compositions are prepared by melt blending using a corotating twin-screw extruder of Thermo Prism model TSE16TC type exhibiting a diameter of 16 mm and a length/diameter ratio equal to 25.

The compositions prepared are as follows:
- Composition A1: 90% by weight of polyamide and 10% by weight of polyurethane, with respect to the total weight of the composition
- Composition A2: 95% by weight of polyamide and 5% by weight of polyurethane, with respect to the total weight of the composition Composition A3: 98% by weight of polyamide and 2% by weight of polyurethane, with respect to the total weight of the composition Composition A4: 100% by weight of polyamide, with respect to the total weight of the composition.

The extruder conditions for preparing the granules of compositions A1 to A4 are:

Set temperature profile in the extruder (in ° C.): 255(die)-250-250-255-255,

Temperature of the molten polymer in the extruder: for A1 and A2≤267° C., for A3≤266° C. and for A4≤268° C., Rotational speed: 407 revolutions/min, and Throughput: 2.7 k/gh for A1, A2 and A3 and 2.2 k/gh for A4.

The extruded compositions A1-A4 are cooled in water at ambient temperature and cut up in the form of granules.

The observation by scanning electron microscopy of the sections of granules obtained after exposure to a solvent for polyurethane but not for PA, in this case THF, results in the observation of polyurethane nodules in the PA matrix. For example, for the composition A3, five sections with a surface area of 670 μm$^2$ comprise on average more than 50 PU nodules for which the greatest dimension is 50 nm.

Example 2

Properties of the Polyamide Granules Comprising the Fluidizing Agent at 310° C.

The influence of the presence of the fluidizing agent on the rheological properties of the polyamide was studied at 310° C., a temperature which makes it possible to decompose the urethane functional groups of the fluidizing agent to give isocyanate functional groups and consequently to generate $CO_2$. The temperature profile used is described in table 1:

TABLE 1

| Single-screw extruder zone 1 | Single-screw extruder zone 2 | Single-screw extruder zone 3 | Zone of the gear pump | Zone of the capillary die | Counter-pressure chamber |
|---|---|---|---|---|---|
| 310° C. | 310° C. | 310° C. | 310° C. | 310° C. | 310° C. |

The polyamide granules comprising the fluidizing agent were placed in the hopper of the single-screw extruder of the ALR rendered inert with nitrogen. The pressure at the capillary outlet was maintained above 100 bar by virtue of the counter-pressure cell in order to keep the $CO_2$ dissolved in the molten polyamide and to prevent the appearance of gas bubbles.

The viscosity measurements were carried out at a shear gradient of 896 s$^{-1}$ with a capillary die exhibiting a length/diameter ratio of 30/1.

The conditions and the results of the viscosity measurements and also the average molar masses of the polyamides at the capillary die outlet are collated in table 2. The mean pressure of the viscosity measurement reported in table 2 corresponds to the arithmetic mean between the pressures measured at the inlet and at the outlet of the capillary in the presence of the counter-pressure cell.

TABLE 2

|  | A1 | A2 | A3 | A4 |
|---|---|---|---|---|
| Water content (ppm) | 1700 | 2100 | 2000 | 1900 |
| Speed of the gear pump (revolutions/min) | 4 | 4 | 4 | 4 |
| Screw speed in the single-screw extruder (revolutions/min) | 85 | 85 | 85 | 85 |
| Pressure upstream of the gear pump (bar) | 123 | 150 | 118 | 96 |
| Mean pressure of the viscosity measurement (bar) | 201 | 202 | 192 | 198 |
| Melt viscosity (Pa · s) | 13 | 16 | 22 | 32 |
| Number-average molar mass (g/mol) | 35 600 | 40 200 | 39 400 | 40 600 |
| Weight-average molar mass (g/mol) | 67 300 | 78 400 | 75 500 | 77 000 |

These experimental results show the fluidizing effect of the addition of PU to the PA. This decrease in viscosity is related to the presence of $CO_2$ dissolved in the molten polymer and not to a decrease in its molar mass.

Example 3

Properties of the Polyamide Granules Comprising the Fluidizing Agent at 280° C.

The influence of the presence of the fluidizing agent in the polyamide granules was studied at 280° C., a temperature which also makes it possible to decompose the urethane functional groups of the fluidizing agent to give isocyanate functional groups and consequently to generate $CO_2$. The temperature profile used is described in table 3:

TABLE 3

| Single-screw extruder zone 1 | Single-screw extruder zone 2 | Single-screw extruder zone 3 | Zone of the gear pump | Zone of the capillary die | Counter-pressure chamber |
|---|---|---|---|---|---|
| 280 | 280 | 280 | 280 | 280 | 280 |

The polyamide granules comprising the fluidizing agent were placed in the hopper of the single-screw extruder of the ALR rendered inert with nitrogen. The pressure at the capillary outlet was maintained above 100 bar by virtue of the counter-pressure cell in order to keep the $CO_2$ dissolved in the molten polyamide and to prevent the appearance of gas bubbles.

The viscosity measurements were carried out at a shear gradient of 896 s$^{-1}$ with a capillary die exhibiting a length/diameter ratio of 30/1.

The conditions and the results of the viscosity measurements and also the average molar masses of the polyamides at the capillary die outlet are collated in table 4. The mean pressure of the viscosity measurement reported in table 4 corresponds to the arithmetic mean between the pressures measured at the inlet and at the outlet of the capillary in the presence of the counter-pressure cell.

TABLE 4

|  | A1 | A4 |
|---|---|---|
| Water content (ppm) | 1700 | 1900 |
| Speed of the gear pump | 4 | 4 |

TABLE 4-continued

|  | A1 | A4 |
|---|---|---|
| (revolutions/min) | | |
| Screw speed in the single-screw extruder (revolutions/min) | 65 | 80 |
| Pressure upstream of the gear pump (bar) | 261 | 269 |
| Mean pressure of the viscosity measurement (bar) | 199 | 201 |
| Melt viscosity (Pa · s) | 68 | 86 |
| Number-average molar mass (g/mol) | 49 700 | 42 600 |
| Weight-average molar mass (g/mol) | 100 300 | 79 000 |

These experimental results show the fluidizing effect of the addition of PU to the PA. At this temperature, the reactions which generate $CO_2$ result in an increase in the average molar mass of the PA. The decrease in viscosity is related to the presence of $CO_2$ dissolved in the molten polymer. It is smaller than in example 2 as a result of the increase in the molar mass of the PA and of the smaller amount of $CO_2$ given off at 280 than at 310° C. This smaller amount of $CO_2$ is explained by the kinetics of the chemical reactions, which generate $CO_2$ less rapidly at 280 than at 310° C.

Example 4

Properties of the Polyamide Granules Comprising the Fluidizing Agent at 300° C.

The influence of the presence of the fluidizing agent in the polyamide granules was studied at 300° C., a temperature which also makes it possible to decompose the urethane functional groups of the fluidizing agent to give isocyanate functional groups and consequently to generate $CO_2$. The temperature profile used is described in table 5:

TABLE 5

| Single-screw extruder zone 1 | Single-screw extruder zone 2 | Single-screw extruder zone 3 | Zone of the gear pump | Zone of the capillary die | Counter-pressure chamber |
|---|---|---|---|---|---|
| 300 | 300 | 300 | 300 | 300 | 300 |

The polyamide granules comprising the fluidizing agent were placed in the hopper of the single-screw extruder of the ALR rendered inert with nitrogen. The pressure at the capillary outlet was maintained above 100 bar by virtue of the counter-pressure cell in order to keep the $CO_2$ dissolved in the molten polyamide and to prevent the appearance of gas bubbles.

The viscosity measurements were carried out at a shear gradient of $896\ s^{-1}$ with a capillary die exhibiting a length/diameter ratio of 30/1.

The conditions and the results of the viscosity measurements and also the average molar masses of the polyamides at the capillary die outlet are collated in table 6. The mean pressure of the viscosity measurement reported in table 6 corresponds to the arithmetic mean between the pressures measured at the inlet and at the outlet of the capillary in the presence of the counter-pressure cell.

TABLE 6

|  | A1 | A4 |
|---|---|---|
| Water content (ppm) | 1700 | 1900 |
| Speed of the gear pump (revolutions/min) | 4 | 4 |
| Screw speed in the single-screw extruder (revolutions/min) | 70 | 85 |
| Pressure upstream of the gear pump (bar) | 189 | 140 |
| Mean pressure of the viscosity measurement (bar) | 201 | 196 |
| Melt viscosity (Pa · s) | 33 | 46 |
| Number-average molar mass (g/mol) | 44 800 | 40 600 |
| Weight-average molar mass (g/mol) | 87 600 | 75 000 |

These experimental results show the fluidizing effect of the addition of PU to the PA. Under these conditions, in particular temperature conditions, the reactions which generate $CO_2$ result in an increase in the average molar mass of the PA.

The invention claimed is:

1. A process for the preparation of a polyamide article, the process comprising the stages of:
    a) heating a composition comprising at least one polyamide PA and at least one compound U comprising at least one urethane functional group, at a temperature T, for a time t and at a pressure P;
    wherein the temperature T and the time t are such that $CO_2$ is generated and the melt viscosity of the composition is decreased, in comparison with the melt viscosity of the composition without compound U,
    wherein the pressure P is above 100 bar and such that the $CO_2$ generated is dissolved in the blend of PA and compound U, and
    the temperature T is greater than or equal to 280° C.,
    b) recovering the article.

2. The process as claimed in claim 1, wherein the article exhibits a density d in accordance with the following relationships:

$$d \geq A \times D \quad (1)$$

with $$1/D = \text{sum of } (X1\%/(100 \times \text{density } C1)), (X2\%/(100 \times \text{density } C2)) \text{ to } (Xn\%/(100\ \text{density } Cn)) \quad (2)$$

wherein:
    C1, C2, to Cn represent the compounds 1, 2, to n present in the composition employed in order to obtain the article,
    X1%, X2%, to Xn % are the % by weight respectively of the compounds C1, C2, to Cn,
    sum of X1%, X2%, to Xn %=100, and
    A=0.95.

3. The process as claimed in claim 1, wherein the article comprises a composition comprising a thermoplastic polymer resulting from the coupling of PA with the compound U, in which the average molar mass of the thermoplastic polymer is at least equal to the molar mass of the starting polyamide.

4. The process as claimed in claim 3, wherein the number-average molar mass of the thermoplastic polymer is increased by at least 5%.

5. The process as claimed in claim 3, wherein the weight-average molar mass of the thermoplastic polymer is increased by at least 5%.

6. The process as claimed in claim 1, further comprising a stage of injection molding and/or of extrusion.

7. The process as claimed in claim 1, wherein the polyamide PA is chosen from the group consisting of polyamide 6, polyamide 6,6, polyamide 11, polyamide 12, polyamide 4,6, polyamide 6,10, polyamide 10,10, polyamide 12,12, polyamide 6,36, semiaromatic polyamides, polyphthalamides obtained from terephthalic acid and/or isophthalic acid, and copolymers and alloys thereof.

8. The process as claimed in claim 7, wherein the polyamide PA is chosen from the group consisting of polyamide 6, polyamide 6,6, and their blends and copolymers.

9. The process as claimed in claim 1, wherein the composition comprises a polyamide content ranging from 30% to 99.9% by weight, with respect to the total weight of the composition.

10. The process as claimed in claim 1, wherein the compound U is a polyurethane or a compound of the polyisocyanate blocked by an alcohol or a phenol type.

11. The process as claimed in claim 1, wherein the compound U is a polyurethane having a number-average molecular weight of greater than or equal to 5000 g/mol.

12. The process as claimed in claim 1, wherein the composition comprises from 20% to 70% by weight of reinforcing filler, with respect to the total weight of the composition.

13. The process as claimed in claim 8, wherein the polyamide PA is a polyamide 6,6.

14. The process as claimed in claim 10, wherein the compound U is a thermoplastic polyurethane.

15. The process as claimed in claim 7, wherein semiaromatic polyamides comprise MXD6.

16. The process as claimed in claim 1, wherein the temperature T is 280° C. to 310° C.

17. The process as claimed in claim 14, wherein the thermoplastic polyurethane is an aliphatic thermoplastic polyurethane based on ε-caprolactone.

18. The process as claimed in claim 1, wherein the compound U is present in the composition in a content ranging from 1% to 10% by weight, with respect to the total weight of PA and of compound U.

19. The process as claimed in claim 18, wherein the compound U is present in the composition in a content ranging from 2% to 10% by weight, with respect to the total weight of PA and of compound U.

* * * * *